United States Patent Office 2,818,163
Patented Dec. 31, 1957

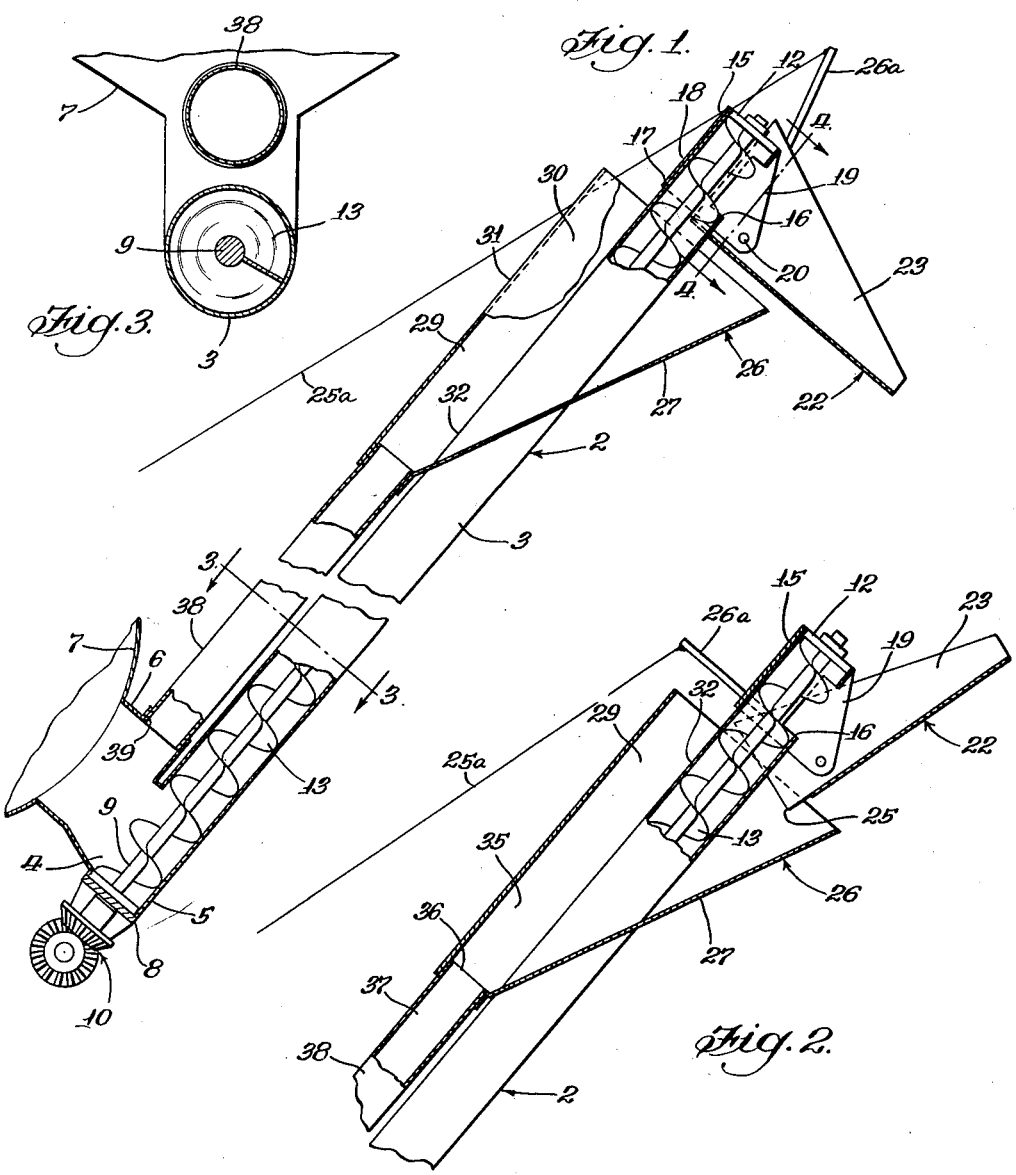
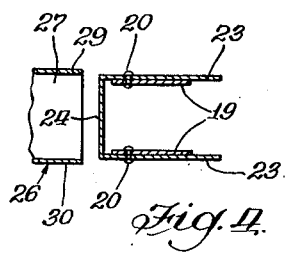

2,818,163

RECIRCULATING CONVEYOR

Samuel E. Hilblom and Peter Sammarco, Chicago, Ill., assignors to International Harvester Company, a corporation of New York Application May 16, 1955, Serial No. 508,349

1 Claim. (Cl. 198—73)

This invention relates to conveyors and more particularly to a novel conveyor having means adapted to temporarily suspend discharge of the conveyor by recirculating the material.

A more specific object of the invention is to provide a novel arrangement for recirculating the material wherein power activated conveyor means is utilized to normally discharge material and a gravity return type of conveyor means is utilized to recirculate the material when it is necessary to temporarily halt the discharge of the primary conveyor.

These and other objects of the invention become more apparent from the specification and the drawings wherein:

Figure 1 is a fragmentary side elevational view partially in longitudinal section of the novel recirculating conveyor illustrating the same in normal discharging position;

Figure 2 is a fragmentary view comparable to Figure 1 and illustrating the parts disposed in recirculating position;

Figure 3 is a transverse sectional view taken substantially on the line 3—3 of Figure 1; and Figure 4 is a section on line 4—4 of Figure 3.

Describing the invention in detail, the conveyor generally designated 2 comprises a tube 3 of cylindrical construction adapted to be positioned in an upwardly and outwardly inclined position and having an intake end 4 at its lower extremity 5 with an upwardly directed opening which communicates through a chute 6 to the lower end of a hopper 7. The tube is closed at its lower end by an end plate 8 which journals the lower end of an auger shaft 9 and the shaft projects below the lower end of the tube 5 and thereat is connected to power transmission means 10 in the form of gearing which is suitably driven from a central power source such as a tractor. The shaft 9 extends axially through the center of the tube 5 and at its upper end is journaled on an end closure member 12 and intermediate its ends supports a spiral auger flight 13 which it rotates in order to move the material upwardly from the bottom end out of the tube to the upper end 15 of the tube and discharge the material through a downwardly and rearwardly extending discharge opening 16 in said upper end of the tube.

The upper end of the tube is provided with a U-shaped hinge member 17 the bight of which straddles the top side of the tube and the legs 19 of which extend at opposite sides of the tube and are preferably weld connected to the tube and extend therebelow in flanking relation to the discharge opening 16. The lower end of each leg 19 is provided with a pin 20 which pivotally mounts a discharge chute 22 on a transverse axis, each hinge pin 20 extending through an upstanding side wall 23 of the U-shaped chute, the side walls 23 being interconnected to a transverse wall 24. It will be appreciated that normally the auger is driven to discharge material such as grain upwardly through the discharge opening therein and from thence the material is directed by the chute structure 22 to a suitable receptacle such as a wagon box or the like and the chute structure in such position inclines downwardly and rearwardly. However, if for some reason it is necessary to temporarily interrupt the discharge of the material or the grain such as when the harvesting unit to which this conveyor is attached is normally turned around at the end of the field and the trailing wagon into which it is to discharge is misaligned with respect thereto, the operator merely swings the chute structure upwardly as shown in Figure 2 by means of cable 25a connected to an arm 26a which is connected to the chute, and the material then discharges downwardly and forwardly from what is normally the upper end 25 of the chute 22 into a surrounding funnel 26 which encompasses the upper end of the tube slightly below the discharge opening 16. The funnel portion has a downwardly and forwardly inclined bottom wall 27 interconnected by spaced side walls 29 and 30 along the lower edges thereof and the upper edges of the walls 29 and 30 are interconnected with a top wall 31 which extends over and is spaced vertically with respect to the top side 32 of the auger tube. The walls 29, 30 and 31 form a passage 35 for the grain, the walls 29 and 30 being connected with the opposite sides of the tube 3 and the wall 27 being suitably apertured to receive the tube 3 therethrough and extending at an acute angle to the axis of the tube. The funnel 26 has a discharge end 36 which communicates with the upper end 37 of a tubular conveyor pipe 38 which is disposed above the tube 3 in generally paralleling relationship thereto, the tube 38 having a lower end communicating through an opening 39 with a top back side of the chute 6 which leads back to the lower inlet end of the power conveyor.

It will be readily observed as seen in Figure 2 that upon swinging the discharge chute 22 upwardly the normally upper end of the chute 22 is brought downwardly into discharge relationship with the funnel 26 and that material accumulating in the funnel will gravitationally flow downwardly through the tube 38 back into the chute 4 and from thence into the inlet end of the outer conveyor. It will be appreciated that this feature is intended for use where a momentary delay in discharge of the material is desired without the necessity of completely stopping the conveyor.

What is claimed is:

The combination of a tubular upright housing inclined from the vertical and having upper and lower sides and having a lower end with an inlet in its upper side and having an upper end with an outlet in its lower side and a conveyor therein operative to move material from the inlet and discharge it from said outlet, a trough shaped chute underposed with respect to said outlet and having a bottom and upstanding sides, said sides pivotally mounted from said housing, a funnel structure intermediate said inlet and outlet encompassing and connected to said housing adjacent to said upper end thereof and flaring upwardly to adjacent said outlet, said bottom wall of the structure extending diagonally to said housing from beneath said bottom side to above said top side and terminating in a narrow discharge opening above said housing, a tube connected to said funnel and supported above the housing generally parallel thereto and extending to and communicating with said inlet at a point thereabove, said chute swingable to a position inclining oppositely to said housing for guiding material issuing from said outlet to an associated receiver and said chute swingable to a position discharging into said funnel for return of the material to said inlet through said tube.

References Cited in the file of this patent

UNITED STATES PATENTS

| | | |
|---|---|---|
| 1,005,049 | Lorenzen | Oct. 3, 1911 |
| 1,462,660 | Rollefson | July 24, 1923 |